UNITED STATES PATENT OFFICE.

HERMANN EISENLOHR, OF KARLSRUHE, GERMANY.

METHOD OF PRODUCING A NEW CERAMIC MASS AND OF MANUFACTURING POTTERY.

No. 901,599.  Specification of Letters Patent.  Patented Oct. 20, 1908.

Application filed June 7, 1906. Serial No. 320,651.

*To all whom it may concern:*

Be it known that I, HERMANN EISENLOHR, residing at 21 Victoria street, in the city of Karlsruhe, Germany, have invented new and useful Improvements in Methods of Producing a New Ceramic Mass and of Manufacturing Pottery of All Kinds Therefrom, of which the following is a specification.

The present invention relates to the production of a new ceramic mass and to the production therefrom of vessels, which can sustain sudden and rapid changes of temperature.

Though natural and artificial aluminium oxid have been employed in making ceramic ware or pottery which is to withstand rapid changes of temperature, the present invention which is directed to a similar object, depends on the perfectly new observation, that sintered porcelain-like vessels may be made from a mixture of plastic and non-plastic clay (that is clay from which the plasticity has been removed by burning) or quartz with a hard glass of high silica content which is made easily with absolute uniformity of a certain composition. The ware made from this mass is characterized not only by its resistance to rapid changes of temperature but also by other important technical properties and by satisfactory outward appearance.

The new ceramic mass consists of about one half of clay of any suitable kind and about one half of a hard glass of a high silica content, which is composed only of silica, as main constituent, alumina, alkalies and alkaline earths with the characteristic of great hardness combined with toughness and insensitiveness to changes of temperature. A particularly suitable hard glass is covered by the application for Letters Patent Ser. No. 320650 June 7th 1906.

The production of the ceramic mass is performed by mixing the suitably fine granulated hard-glass with non-plastic clay or with quartz. To this mixture plastic clay as a binding material is added and vessels are formed, which are burned in a stone-ware kiln at a temperature of about 1200 C. (Seger pyrometer 3.4). This low burning temperature which heretofore could not be employed in manufacturing porcelain, has of course in the manufacture of the ware numerous technical and economical advantages, *i. e.* less strain of the material of the kiln, short burning duration which latter involves a better utilization of the kiln, less breakage and important saving of fuel. By this low burning temperature also ware which may be more easily decorated than porcelain, is obtained. Owing to this latter property the new mass is especially adapted for the manufacture of vessels for the household, the product being very transparent and though burned at a low temperature, very hard.

The new mass is especially suitable for the manufacture of articles subjected to sudden changes of temperature and in addition to this insensibility against alkalies and acids at higher temperatures offers, together with the fact that it is not materially affected by changes of temperature, the chance that the mass may also be advantageously used for the manufacture of vessels for chemical purposes.

What I claim is:

The herein described method of manufacturing pottery consisting in mixing granulated glass, having a content of at least 75% of silica and about 10% of alumina, with a non-plastic clay or quartz, adding to said mixture plastic clay to serve as a binding material, molding the desired vessels from such material, and burning the vessels.

In witness whereof, I have hereunto signed my name in the presence of two subscribing witnesses.

HERMANN EISENLOHR.

Witnesses:
 E. RISHO,
 WALTER C. SCHNEIDER.